United States Patent Office 3,647,903
Patented Mar. 7, 1972

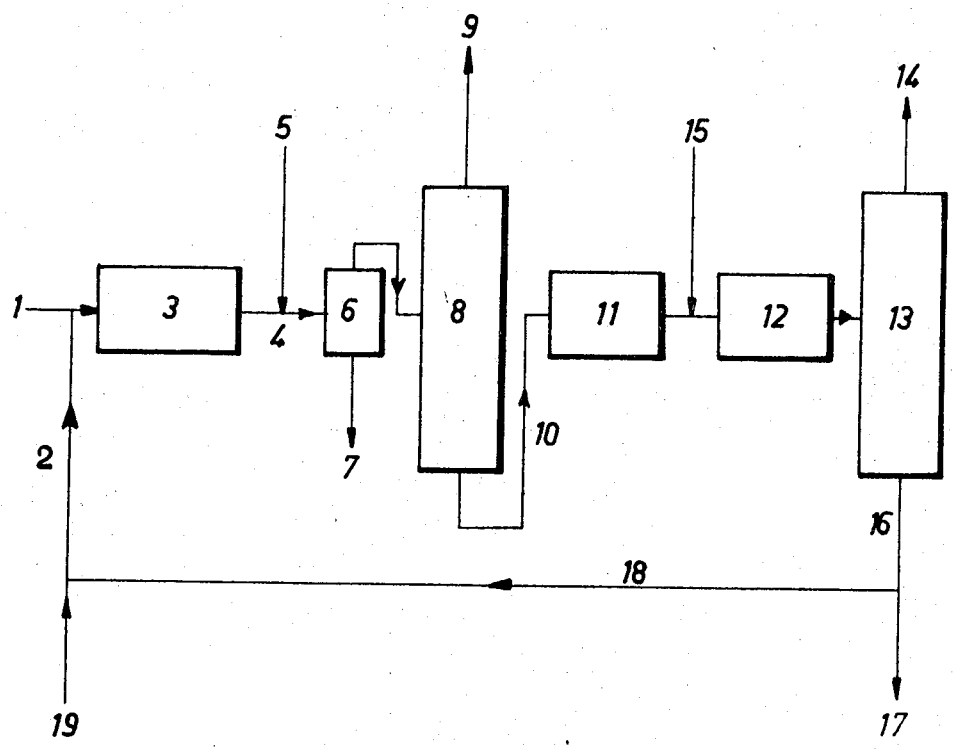

3,647,903
METHOD OF PREPARING DIOLEFINS HAVING CONJUGATED DOUBLE BONDS
Jean Maurin, Montivilliers, France, assignor to Compagnie Francaise de Raffinage, Paris, France
Filed May 4, 1970, Ser. No. 34,172
Claims priority, application France, May 8, 1969
6914751
Int. Cl. C07c $1/00, 1/20$
U.S. Cl. 260—681    13 Claims

ABSTRACT OF THE DISCLOSURE

A method for preparing a diolefin such as isoprene has been provided whereby an α-glycol or an α-epoxy as a precursor for a monoester formation is reacted directly or first obtained from a paraffin by hydroperoxidation and then reacted with an acid or its anhydride to obtain said monoester and the monoester pyrolyzed to obtain a desired diolefin. In the pyrolysis step the acid is obtained as a recycleable starting material. The process is characterized by improved yields of the diolefin and minimized amounts of carbonyl compounds.

---

This invention relates to a method of preparing conjugated dienes from alpha-glycols or epoxides; more particularly it relates to the preparation of conjugated dienes containing a tertiary carbon atom from alpha-glycols or epoxides of the same carbon structure.

In the specification and claims the following expressions will have the meaning indicated below:

Alpha-glycols: diols whose two hydroxy (—OH) functions are attached to two adjacent carbon atoms of the molecule;

Alpha-epoxides: olefin oxides, the oxygen atom of which is bound to two adjacent carbon atoms;

Conjugated dienes: diolefin hydrocarbons having conjugated double bonds.

It is known that the conjugated dienes are very desirable for the manufacture of synthetic materials, and particularly for the synthesis of various types of rubber. In particular, butadiene is a monomer used in the manufacture of a synthetic rubber of the styrene-butadiene or polybutadiene type and isoprene is a monomer which is in great demand for the synthesis of a rubber known as "synthetic natural rubber," since polyisoprene has a structure which is very close to that of natural rubber.

Numerous methods of manufacture have been devised for the production of conjugated dienes. It has been proposed, inter alia, to dehydrate the glycols of the corresponding epoxides. However, the direct catalytic dehydration of alpha-glycols and alpha-epoxides leads to the formation of ketones in abundant quantity, the ketone function resulting from the spontaneous isomerization of the enol which is the intermediate dehydration product; thus butanediol-2,3, for instance, upon dehydration, gives methyl ethyl ketone. This drawback has been avoided by passing through the intermediary of the esters, glycols and acetic acid; this last method has furthermore been simplified by reacting over a dehydration catalyst a mixture of acetic acid and diol without prior separation of the acetic esters. Unfortunately, this process does not give conjugated dienes in good yields such as from diols in which one of the hydroxyls is bound to a tertiary carbon atom, as is true of methol-butane-diol-2,3 and the corresponding epoxide.

The object of the present invention is to provide a method of manufacturing conjugated dienes containing a carbon atom which is bound by a double bond to another carbon atom and by two single bonds to two other carbon atoms, the said conjugated dienes being obtained from alpha-glycols or alpha-epoxides one of the hydroxyl groups or one of the two bonds of the oxygen atom of which respectively is attached to a tertiary carbon atom, this method having the advantage of causing the formation of only a very small amount of ketone.

Another object of the invention is the preparation of conjugated dienes from the corresponding paraffin hydrocarbon by conversion of the latter into alpha-glycol or alpha-epoxide and subsequent dehydration by the method of the invention.

The method in accordance with the invention results from the following discovery while in the direct catalytic dehydration of mono-esters derived from alpha-epoxides or alpha-glycols one of the two bonds of the oxygen atom or one of the hydroxyl groups of which, respectively, is attached to a tertiary carbon atom is not very selective and give rise to ketones by isomerization as in the case of the direct dehydration of alpha-epoxides or alpha-glycols, it is surprisingly found that if one effects a cracking of the monoester prior to dehydration, the formation of a ketone is avoided.

Accordingly, the object of the present invention is a method of manufacturing conjugated dienes containing a carbon atom bound by a double bond to another carbon atom and by two single bonds to two other carbon atoms, the said process consisting—starting from alpha-glycols or alpha-epoxides, in effecting the synthesis of a carboxylic monoester of the glycol in question by means of a mono-carboxylic acid or a monocarboxylic anhydride and then pyrolizing said monoester so as to obtain an ethylene alcohol, thereupon dehydrating said ethylene alcohol into a conjugated diene and separating the conjugated diene thus obtained.

The invention will be described in detail below with reference to the preparation of isoprene from methyl butane diol-2.3 and the examples cited will refer to the preparation of isoprene from methyl epoxy-2,3-butane, but the invention is, of course, not limited to the preparation of isoprene. It may be employed just as well for the preparation of any conjugated diene containing a carbon atom bound by a double bond to another carbon and by two single bonds to two other carbon atoms.

The preparation of the monoester is effected by any known process, for instance by contacting the alpha-glycol or the corresponding epoxide and an anhydride of a monocarboxylic acid or said monocarboxylic acid itself in the presence of a catalyst either in liquid phase or in vapor phase. The esterification temperature is not critical. In liquid phase it may vary between 50–150° C. Likewise, the other conditions of reaction velocity and pressure are not of a critical nature. They are selected as a function of the diene which it is desired to obtain.

The monocarboxylic acid used is an acid which can vaporize under reaction conditions. It may, for instance, be acetic acid, propionic acid, butanoic acid, etc. Acids of less than 5 carbon atoms are preferred.

The pyrolysis of the carboxylic monoester of methyl butane-diol-2,3 varies from 400 to 600° C., depending on the monocarboxylic acid used and the diene which it is desired to obtain; in particular, for the production of isoprene, the acetic monoester of methyl butane-diol-2,3 is pyrolized between 500 and 600° C. Depending on the rate of the conversion resulting from this pyrolysis, that is to say, depending on the residence time of the reagents at the temperature of the reaction, there is obtained a greater or lesser purity of the intermediate ethylene alcohol.

In general, the conversion is limited to a value of less than 90% so as to limit the amount of methyl isopropyl ketone which is produced. This conversion may vary within a very wide range, depending on the desired purity, and it may for instance, be between 25 and 90%, which corresponds to a space velocity of between 0.4 and 1 v./v./hr.

In the case of production of isoprene, the ethylene tertiary alcohol obtained as intermediate product is methyl-2-buten-3-ol or dimethyl vinyl carbinol which will hereinafter be referred to as DMVC.

The dehydration of this ethylene tertiary alcohol is effected in the presence of a dehydration catalyst which may, for instance, be alumina, silica gel, activated carbon, kaolin, colloidal clays, thoria, boron phosphate, etc.

The temperature of the dehydration is between 200 and 500° C. and preferably between 250 and 350° C.

One of the important points of the invention which makes the process economical results from the fact that the pyrolysis of acetic acid monoester of methyl butane-diol-2,3 reforms, in addition to the DMVC, the acetic acid which can thus be recycled, after separation, to the esterification phase of the methyl epoxy-2,3-butane or methyl-butane-diol-2,3. It can be seen that in this way the process of the invention is particularly economical, since it does not consume any acetic acid. The esterification reaction of the methyl butane-diol 2,3 or the methyl epoxy-2,3-butane by acetic acid is not necessarily stoichiometric. One generally operates in the presence of an excess of acetic acid.

One can, in accordance with the operating conditions of the process of the invention, and in particular in accordance with the value of the conversion, either separate the esterification product so as to isolate the acetic acid monoester of methyl butane-diol-2,3 and treat this separated ester by pyrolysis or pass the mixture of the products of the reaction, whether or not reacted, directly to pyrolysis. Likewise, in the dehydration phase of the DMVC, one can, depending on the operating conditions, either isolate the DMVC by a separation process and then subject it to dehydration or submit the total pyrolysis products to this dehydration and then separate the isoprene formed from the other products present. The products of the pyrolysis are separated before the dehydration in the event that—the conversion being limited—these products contain a large amount of unconverted monoester which would give a ketone during the dehydration.

The different separations referred to above can be effected by methods known in the art, for instance distillation, extractive distillation, solvent extraction, etc.

One interesting application of the invention resides in the production of isoprene from isopentane. It is known, as a matter of fact, that isopentane, which is a paraffin hydrocarbon, is more abundant than isoamylene, which is an olefin. Now, numerous processes have been proposed for the synthesis of isoprene from olefin, but these are of limited interest due to the price of isoamylene. By the present invention one can produce methyl-2-hydroperoxide-2-butane by oxidation of isopentane and then oxidize isoamylene with this hydroperoxide to form tertiary amyl alcohol and isoamyl epoxide or, if one operates in the presence of water in accordance with U.S. application, Ser. No. 866,357, filed Oct. 14, 1969 or its priority application French patent application No. 16982 filed Oct. 14, 1968, methyl butane-diol-2,3 corresponding to the epoxide; the tertiary amyl alcohol can be dehydrated by conventional means to produce isoamylene which is recycled to the oxidation phase.

Thereupon, the epoxide or methyl butane-diol-2,3 formed can be dehydrated to form isoprene by the process described above.

The different phases of the production of isoprene from isopentane are effected in accordance with conventional means; for example, the hydroperoxidation of isopentane can be effected in the presence of air or some other oxygen-containing gas with the production of by-products consisting of degradation products of alcohols, ketones, acids, etc. However, it will be preferred to limit the conversion of the isopentane in this operation to a value of less than 10% which makes it possible to increase the yield of hydroperoxides.

The isoamylene can then be contacted with the hydroperoxide produced in the preceding phase.

One preferably operates in the presence of an excess of isoamylene which serves as solvent for the hydroperoxide.

This oxidation takes place in the presence of a catalyst which is generally a catalyst containing a metal such as molybdenum, tungsten, vanadium, cobalt, etc.

This operation is generally carried out in liquid phase.

In the aforesaid patent application, the applicant has described a process which makes it possible, by oxidation of isopentene with isopentane hydroperoxide, to obtain methyl butane-diol-2,3 directly.

The characteristic of this process resides in the fact that one operates in the presence of water. In the different phases of the process, one can, depending on the operating conditions, either separate the intermediate products or carry out each of the phases in the presence of the reaction products of the preceding phase.

One can also combine separations of products and reactions without separation.

One embodiment of the method in accordance with the invention, in its application to the production of isoprene from methyl epoxy-2,3-butane, is illustrated schematically in the accompanying drawing.

Methyl epoxy-2,3-butane and acetic acid are introduced via the line 1 and the line 2 into a reactor 3 in which they react while hot in the presence of ferric chloride to give the monoacetic ester of methyl butane-diol-2,3 (MAMBD) which emerges via the line 4. After addition at 5 of a small amount of isopentane intended fully to precipitate the catalyst in reactor 6, the latter is recovered at 7. The resultant mixture comprising the monoester, the unreacted acetic acid and a small amount of methyl isopropyl ketone (MIK) is distilled at 8. The methyl isopropyl ketone and the acetic acid are separated at 9. Further distillation permits the recycling of the acetic acid alone.

The pure monoester is withdrawn through the line 10 and is pyrolyzed in pyrolysis reactor 11 to give primarily dimethyl vinyl carbinol (DMVC) and acetic acid. This mixture passes directly into the catalytic dehydration reactor 12, after which it is separated in the distillation column 13. The isoprene, olefin alcohols, methyl isopropyl ketone and water are recovered at the top of the column at 14. Further distillation permits isolation of the isoprene, the methyl isopropyl ketone and the olefin alcohols; the olefin alcohols are recycled with a small amount of water through line 15. The acetic acid and some heavy products are withdrawn through the line 16.

After separation of the heavy products at 17, the acetic acid is recycled through line 18 into line 1; additional fresh acid is introduced through line 19.

The invention is furthermore illustrated by the following example which is merely illustrative.

EXAMPLE 1 mol of methyl epoxy-2,3-butane is reacted by gradually adding it to 1.5 mol of acetic acid containing ferric chloride which acts as catalyst. The mixture is heated at 90° C. for about 2 hours, by the end of which time the conversion of the epoxide is practically complete. After addition of a small amount of isopentane, the catalyst is separated from the mixture by filtration and a residual distillation is effected. Practically pure monoacetate of methyl butane-diol-2,3 (MAMBD) and about 5% of methyl isopropyl ketone (MIK) are collected.

The monoacetate of methyl butane-diol-2,3 thus prepared is pyrolyzed at 575° C. with a v./v./hr. of 0.45. The mitxure collected has the following composition:

| | Percent by weight |
|---|---|
| Residual MAMBD (monoacetate of methyl butane-diol-2,3) | 5.1 |
| Carbonyls (MIK and other ketones and aldehydes) | 4.4 |
| Olefin alcohols | 42.5 |
| $CH_3CO_2H$ | 46.0 |
| $H_2O$ | 2.0 | which corresponds to a conversion of 93.5% by weight of the MAMBD.

This mixture is then treated without further separation, either alone or diluted with nitrogen, over two types of dehydration catalysts, namely silica gel and neutralized alumina. Two tests were carried out on each of the catalysts. These results are set forth in Table I.

TABLE I

| | Catalyst | | | |
|---|---|---|---|---|
| | Neutralized alumina | | Silica gel | |
| Test number | 1 | 2 | 3 | 4 |
| Temperature, ° C | 300 | 300 | 300 | 300 |
| v./v./hr | 0.9 | 0.9 | 0.9 | 0.9 |
| | mMol / Mol percent | mMol / Mol percent | mMol / Mol percent | mMol / Mol percent |
| Charge: | | | | |
| Olefin alcohols | 20.6 | 20.6 | 20.6 | 30.8 |
| MAMBD (ester) | 1.5 | 1.5 | 1.5 | 2.2 |
| Carbonyls | 2.1 | 2.1 | 2.1 | 3.2 |
| Total | 24.2 | 24.2 | 24.2 | 36.2 |
| $N_2$ (l./hr.) | | 5 | | 5 |
| Conversion, MAMBD plus Alcohols | 17.4 / 71.9 | 12.6 / 52.3 | 21.4 / 88.5 | 24.2 / 66.7 |
| Products obtained: | | | | |
| Isoprene | 10.8 / 62.2 | 7.9 / 62.6 | 13.1 / 61.3 | 18.1 / 74.6 |
| Carbonyls | 4.1 / 23.6 | 3.2 / 25.3 | 3.4 / 15.9 | 4.5 / 18.7 |
| Alcohols | 6.8 | 11.6 | 2.8 | 12.0 |
| MAMBD | | | | |
| Polymers | 2.5 / 14.2 | 1.5 / 12.1 | 4.9 / 22.8 | 1.6 / 6.7 |

In the case of test 4, for instance, the crude pyrolysis product, the composition of which has been given above, was treated over 10 cc. of silica gel at 300° C. with a flow of 9 cc./hr., diluted with 5 l./hr. of nitrogen.

The MAMBD is completely converted. The olefin alcohols are partially converted so that for 100 mol of MAMBD used in the pyrolysis, there remains as convertible product only 33.3 mol of alcohols which may be recycled after separation by dehydration.

The conversion is 66.7% in mols of MAMBD and the alcohols treated; the result mixture has the following composition:

| | Mol percent |
|---|---|
| Isoprene | 74.6 |
| Carbonyls (MIK and other ketones and aldehydes) | 18.7 |
| Polymers | 6.7 |

This example shows the selectivity of the conversion of methyl epoxy-2,3-butane into isoprene by the process of the invention.

By way of comparison, it may be pointed out that the direct dehydration, over neutralized alumina or silica gel, of MAMBD at a temperature of 300° C. with an hourly space velocity of 0.9 in the presence of acetic acid, gives a resultant mixture the composition of which is poorer in isoprene and richer in compounds having a carbonyl function. These compositions have been entered in Table II.

TABLE II

| Catalyst | Neutralized alumina | Silica gel |
|---|---|---|
| Temperature (° C.) | 300 | 300 |
| V./V./hr | 0.9 | 0.9 |
| Charges: | | |
| MAMBD, mol | 28.01 | 28.01 |
| Acetic acid (diluent), mol | 7.97 | 7.97 |
| Conversion: | | |
| Mol | 25.07 | 24.77 |
| Mol percent | 89.5 | 88.4 |
| Products obtained: | | |
| Isoprene: | | |
| Mol | 10.75 | 11.8 |
| Mol percent | 38.4 | 47.7 |
| Carbonyls: | | |
| Mol | 9 80 | 9.11 |
| Mol percent | 34.9 | 36.8 |

What is claimed is:

1. A method for preparing diolefins having conjugated double bonds containing a carbon atom bound by a double bond to another carbon atom and by two single bonds to two other carbon atoms comprising: reacting an α-glycol or an α-epoxide as a precursor with a monocarboxylic acid or a monocarboxylic acid anhydride to obtain a carboxylic monoester of the glycol or expoxide precursor; pyrolyzing said monoester to obtain an ethylene alcohol moiety containing compound, and dehydrating said ethylene alcohol moiety containing compound to obtain a diolefin with conjugated double bonds.

2. The method according to claim 1 and wherein the carboxylic monoester is obtained by esterification of the α-glycol or α-epoxide with a compound selected from the group consisting of acetic acid, propionic acid, butanoic acid and the anyhdrides thereof.

3. The method according to claim 1 and wherein in the pyrolyzing of the said carboxylic monoester the ethylene alcohol is held to less than about 90% yield based of the ethylene alcohol precursor of said starting carboxylic monoester.

4. The method according to claim 1 and wherein the dehydration of the said ethylene alcohol is effected in the presence of a dehydration catalyst of alumina, a silica gel, activated carbon, koalin, a colloidal clay, boron phosphate or thoria.

5. The method according to claim 4 and wherein dehydration is effected at a temperature of between 200 and 500° C.

6. The method according to claim 1 and wherein the monocarboxylic acid is regenerated during pyrolysis of said monoester and is recycled after separation.

7. The method according to claim 1 and wherein isoprene is the diolefin and the glycol or epoxide is methyl butane-diol-2,3 or methyl epoxy-2,3 butane.

8. The method according to claim 1 and wherein the monocarboxylic acid is acetic acid and the monoester is an ester of methyl butane-diol-2,3 and wherein the monoester is pyrolyzed between 500 and 600° C.

9. The method of producing diolefins having conjugated double bonds according to claim 1 and wherein the glycol or epoxide precursor is obtained by conversion of a hydrocarbon into said α-glycol or α-epoxide.

10. The method according to claim 9 and wherein said paraffin hydrocarbon is oxidized to the corresponding hydroperoxide, thereafter the hydroperoxide is reacted with an olefin having the same carbon structure to obtain a mixture of the corresponding epoxide and alcohol and wherein said alcohol is dehydrated to regenerate said olefin.

11. The methods according to claim 9 and wherein isoprene is prepared from isopentane by oxidation of isopentane to methyl-2-hydroperoxide-2-butane and oxidation of isoamylene by said hydroperoxide to form methyl epoxy-2,3-butane or methyl butane-diol-2,3.

12. The method according to claim 11 in which less than 10% of the isopentane is converted into hydroperoxide during hydroperoxidation.

13. The method according to claim 11 in which the hydroperoxide is treated with an excess of isoamylene.

References Cited

UNITED STATES PATENTS

| | | | |
|---|---|---|---|
| 3,118,947 | 1/1964 | Amir | 260—593 |
| 3,232,957 | 2/1966 | Sharp | 260—348.5 |
| 3,391,214 | 7/1968 | Fetterly | 260—681 |
| 3,360,584 | 12/1967 | Kollar | 260—681 |
| 3,360,585 | 12/1967 | Winnick | 260—681 |
| 3,502,740 | 3/1970 | Zajacek et al. | 260—681 |
| 3,510,537 | 5/1970 | Sheng et al. | 260—681 |
| 3,391,213 | 7/1968 | Fetterly | 260—681 |

FOREIGN PATENTS

| | | | |
|---|---|---|---|
| 577,364 | 5/1964 | Great Britain | 260—681 |
| 935,631 | 9/1963 | Great Britain | 260—681 |
| 1,320,977 | | France. | |
| 1,274,507 | 9/1961 | France | 260—681 |

OTHER REFERENCES

Dutch Appln. 68/08227 is equiv., the U.S. 3,391,213, Fetterly.

DELBERT E. GANTZ, Primary Examiner

G. E. SCHMITKONS, Assistant Examiner

U.S. Cl. X.R.

252—437, 432; 260—348.5 R, 484 A, 497 R, 610 B, 632 C, 635 H, 687